Aug. 25, 1936. E. OSTERMIER 2,052,243
GLASS SNAPPING MACHINE
Filed June 23, 1933 4 Sheets—Sheet 2
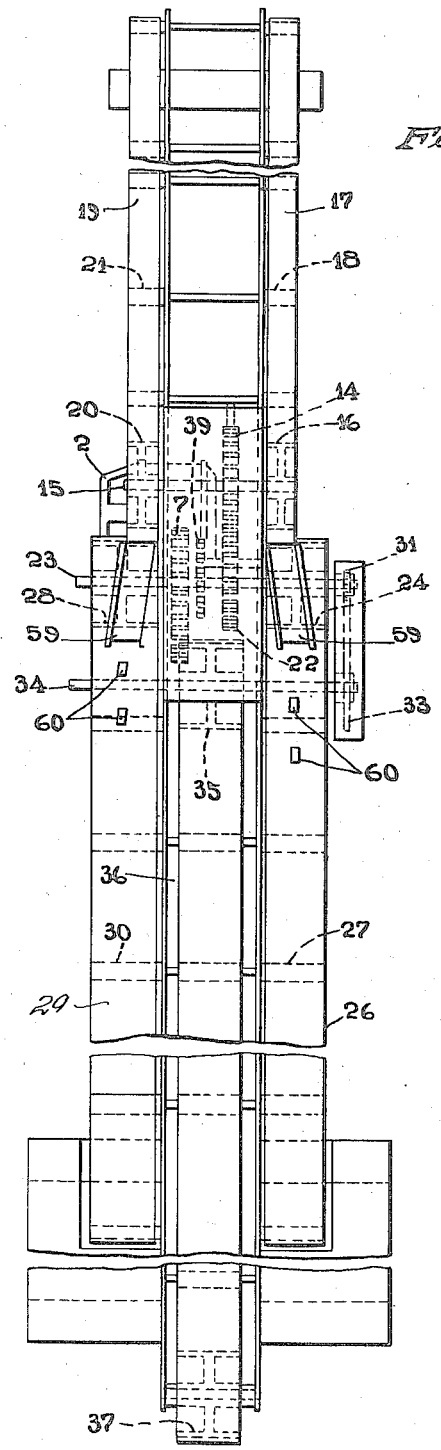
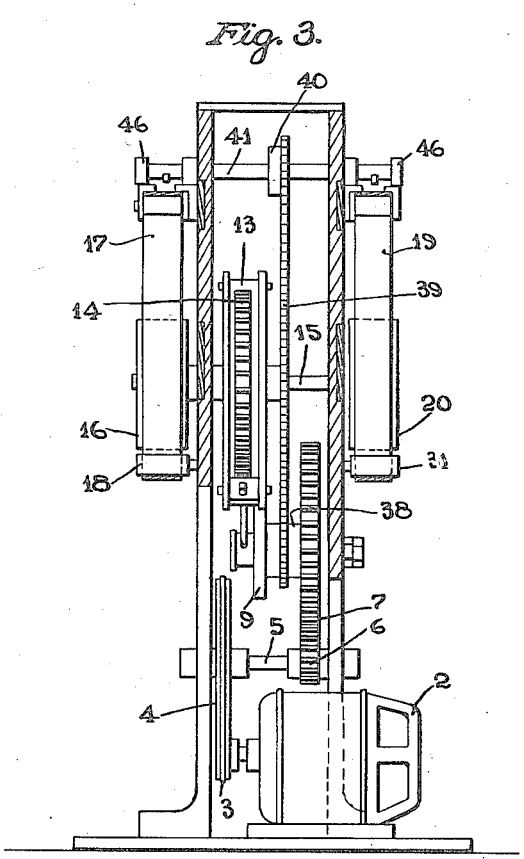
INVENTOR
EDWARD OSTERMIER.
BY Bradley & Bee
ATTORNEYS.

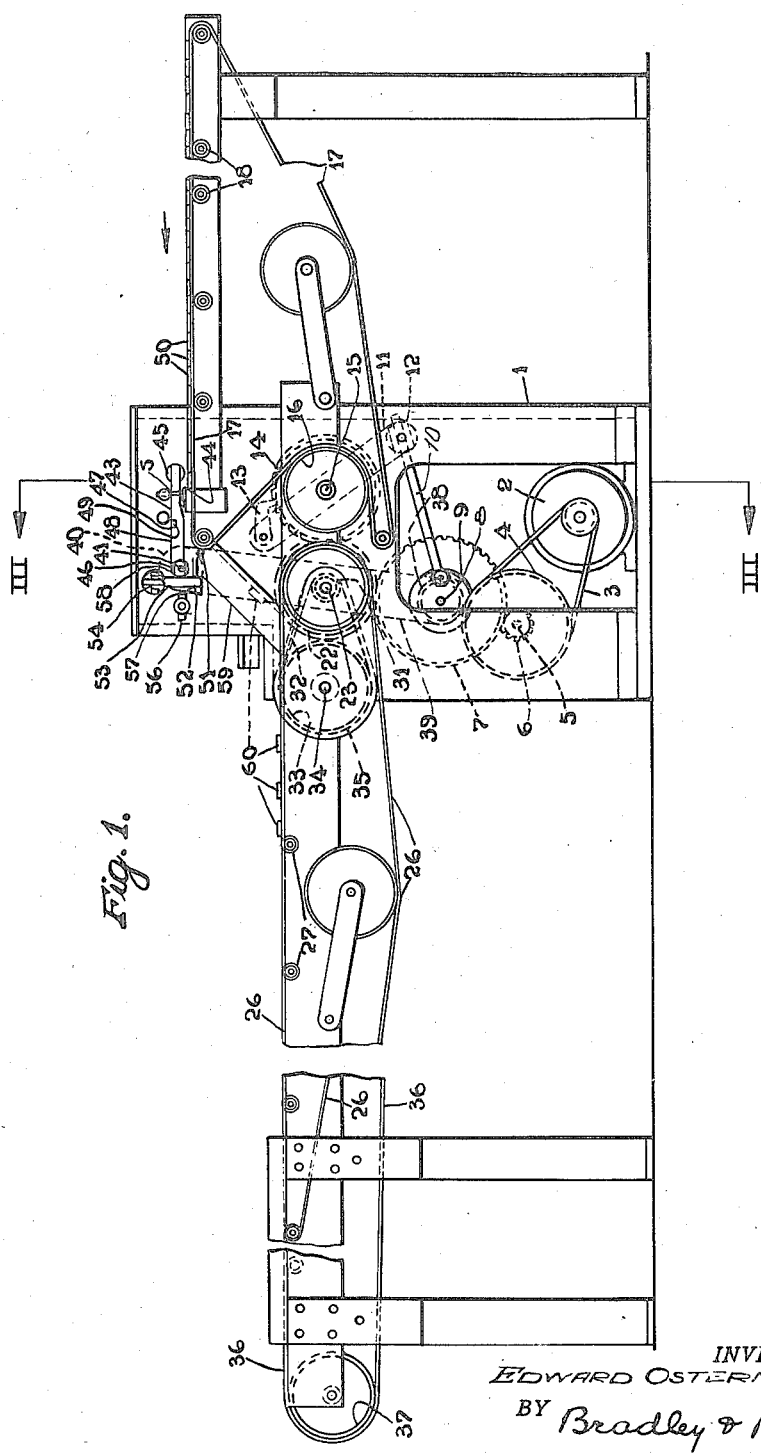

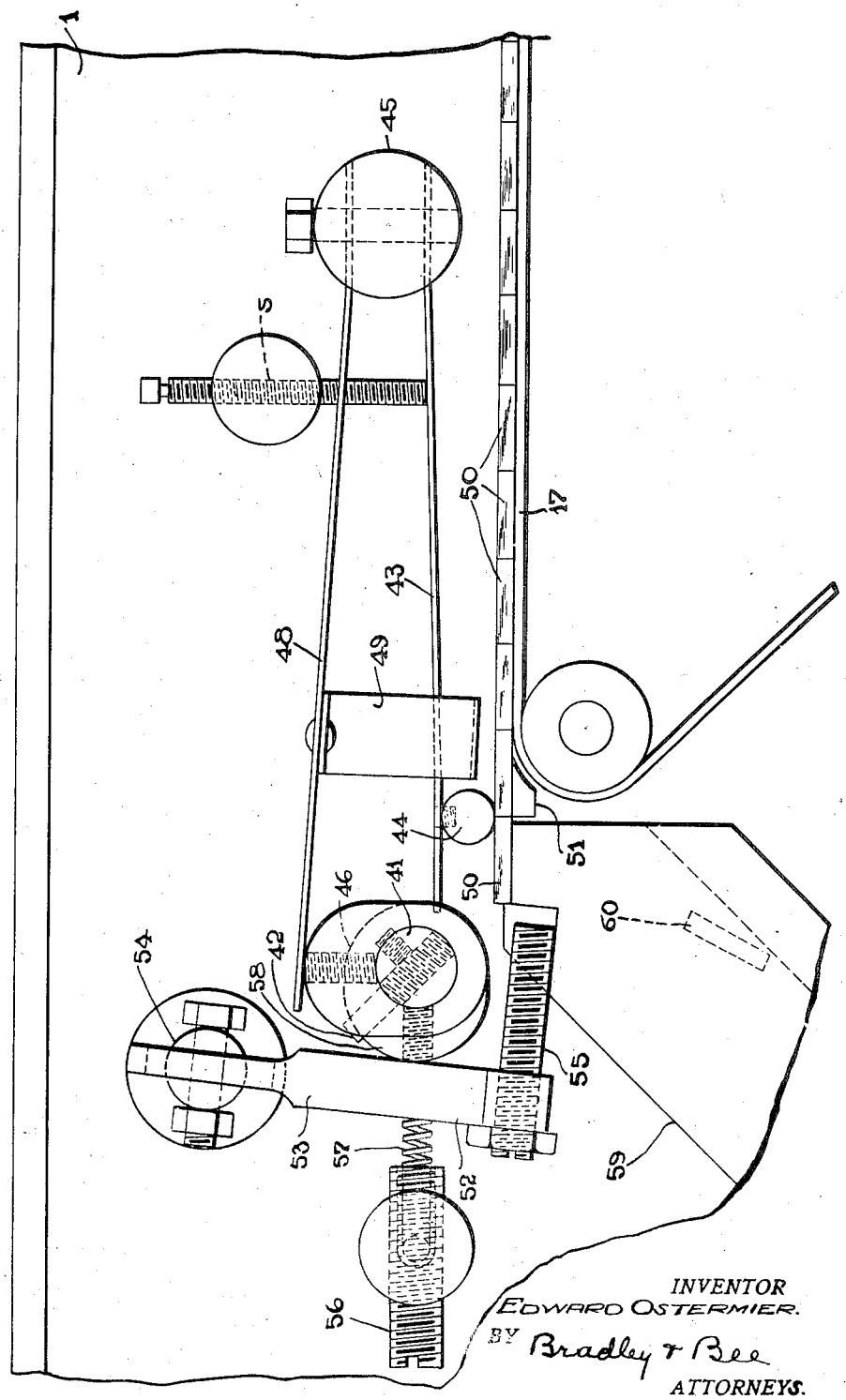

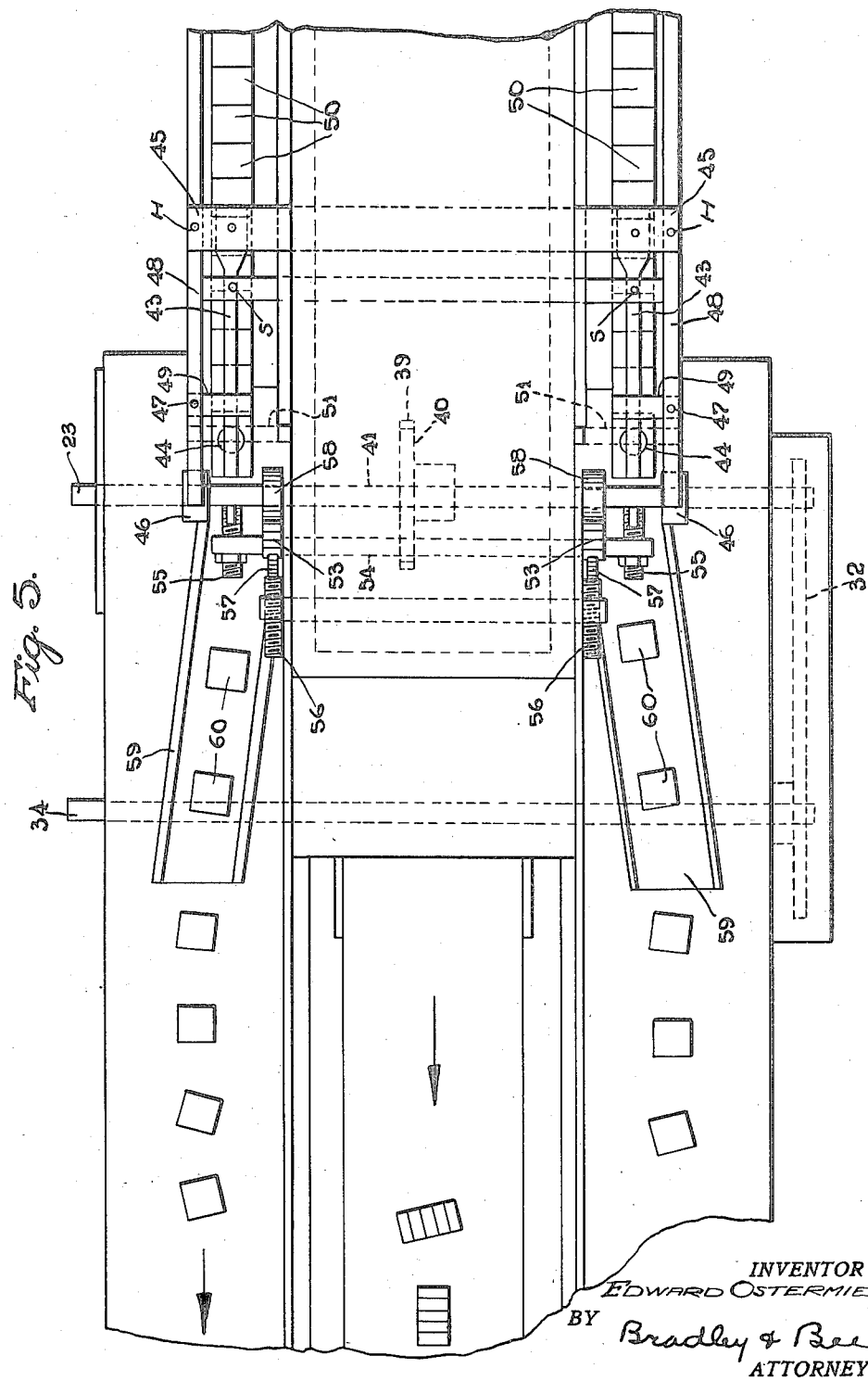

Patented Aug. 25, 1936

2,052,243

UNITED STATES PATENT OFFICE 2,052,243

GLASS SNAPPING MACHINE

Edward Ostermier, Kittanning, Pa., assignor to Pittsburgh Plate Glass Company, a corporation of Pennsylvania Application June 23, 1933, Serial No. 677,252

2 Claims. (Cl. 49—14)

The invention relates to a machine particularly adapted for snapping sections of glass from scored strips to provide optical blanks.

One of the principal advantages of the machine resides in its ability to snap the sections of glass cleanly which is highly desirable in providing optical blanks because such blanks should be as nearly as possible of uniform weight and size.

Another advantage of the machine is the fact that a plurality of glass snapping mechanisms are operated from a single drive unit whereby the capacity of the machine as a whole is large in proportion to the power consumed.

A better understanding of my invention may be had by reference to the accompanying drawings in which corresponding numerals indicate like parts.

Figure 1 is a side elevational view of a machine embodying the principles of my invention; Fig. 2 is a plan view of the machine shown in Fig. 1; Fig. 3 is a sectional view taken substantially along the line III—III of Fig. 1; and Fig. 4 is a fragmentary view upon a larger scale of mechanism embodied in the machine of the previous figures for snapping the sections of glass; and Fig. 5 is a plan view of the assembly shown in Fig. 4.

In practicing my invention, a machine is provided having a drive mechanism that operates in an intermittent manner thereby to advance periodically a plurality of supply belts upon which strips of scored glass are placed. The scored glass strips are advanced intermittently to a position with the scored portions over anvils whereupon hammers are actuated to strike the glass and snap sections therefrom. Stop devices are provided to regulate the position of the glass properly over the anvils. The snapped sections of glass are delivered to a plurality of receiving belts which travel at a somewhat faster rate than the supply belts, but likewise in an intermittent manner. Another belt is utilized between the receiving belts to serve as a common collector for glass inspected and assembled on the receiving belts.

A machine constructed in accordance with my invention embodies a frame 1 upon which a motor 2 is mounted that constitutes the motive power for all of the units of the machine. The motor is connected by means of a belt 3 to a grooved pulley 4 mounted upon a shaft 5 to which a pinion 6 is likewise secured. The pinion is adapted to mesh with a gear 7 secured upon a shaft 8 upon which a disk 9 is mounted. A crank rod 10 is pivoted upon the disk and adjustably connected to a ratchet lever 11, as indicated at 12. The lever actuates a pawl 13 adapted to engage a ratchet wheel 14 mounted upon a shaft 15 to which a pulley 16 is secured. A supply belt 17 is driven by the pulley 16 and guided by idler rolls 18 mounted upon the frame. A second belt 19 is similarly driven by another pulley 20 also mounted upon the shaft 15 and a second group of idler rolls 21 serve to guide the belts.

The ratchet wheel 14 meshes with a gear 22 secured to a shaft 23 upon one end of which a pulley 24 is mounted that drives a receiving belt 26 guided by a plurality of idler rolls 27. Another pulley 28 is mounted upon the other end of the shaft 23 and drives a second receiving belt 29 supported by idler rolls 30. A plurality of feeding belts and receiving belts are thus provided that are operated by a single driving mechanism.

A sprocket 31 is mounted upon the extreme end of the shaft 23 and is connected by a chain 32 to a sprocket wheel 33 secured to a shaft 34. A drive pulley 35 is attached to the shaft and operates a belt 36 supported by an idler pulley 37 mounted upon the frame of the machine. A sprocket wheel 38 is mounted upon the shaft 8 and is connected by a chain 39 to another sprocket wheel 40 secured to a cam shaft 41 and are adapted to actuate periodically a plurality of hammers 43. The hammers are formed of strips of spring steel having balls 44 secured adjacent their ends and are similarly mounted above the feed belts 17 and 19, as indicated at 45. If it is desired to increase the force of the blows the hammers are capable of striking, set screws S may be adjusted to engage the hammers to reduce their effective length and consequently decrease their relative flexibility.

A plurality of cams 46 are adapted to operate a plurality of retaining members 47 formed of strips 48 of spring steel and having engaging members 49 secured thereto. The strips are secured at their ends in a position laterally from the hammers, as indicated at H. The cams 46 intermittently engage the free ends of the strips 48 to dispose the retaining members in an inoperative position. Scored strips of glass 50 are disposed upon the feed belts 17 and 19 and are so advanced as to dwell with the scored portions at the edge of anvils 51, formed of a yieldable material, mounted upon the frame. Stop members 52 engage the portions of the glass overhanging the anvil to regulate proper disposal of the scored portions of the glass and insure an accurate snapping operation. The stop members include arms 53 pivotally mounted, as indicated at 54, in which bolts 55 are adjustably secured to engage the glass when in advanced position as a result of a force applied by screws 56 adjustably maintaining springs 57 in engagement with the arms. Cams 58, also mounted upon the shaft 41, function to force the members to release the glass after being struck by the hammers 43. Chutes 59 are provided to direct snapped sections of the glass 60 upon the receiving belts 26 and 29.

The operation of the machine will be apparent from the foregoing description, but it may be briefly described as follows:

The motor 2 serves to actuate all of the mechanism on the machine by driving the pulley 4 through the belt 3, thereby to operate the ratchet wheel 14 to secure intermittent movement of the belts 17 and 19. Although other speeds might readily be secured, nevertheless it has been found that a desirable speed of travel of the supply belts 17 and 19 is approximately one and three-fourths of an inch per stroke. The glass 50 which is previously scored is adjusted upon the supply belts and periodically advanced so that the scores come to rest immediately above the anvils 51. Regulation of the position of the glass is controlled by means of the stops 52 which are operated by means of the cams 58 secured to the cam shaft 41. The stop arms 53 are, of course, constantly urged in a forward position to engage the glass as it is advanced by the supply belts and stop movement thereof in a proper position over the anvils.

The hammers are actuated by the pins 42 upon the cam shaft 41 to cause the balls 44 to strike the glass immediately upon the scored sections. The hammers being resilient, strike a blow which tends to snap the glass cleanly and provide uniform sections. As the sections are snapped, the cams 58 retract the stops from their operative position to permit the blanks to drop upon the chutes 59 by means of which they are directed to the belts 26 and 29. The latter belts are operated by the same drive mechanism as the supply belts, but by proper selection of gears they are caused to travel at a rate of three inches per stroke and consequently assure desirable separation of the snapped blanks.

Operators at each side of the machine assemble the blanks and inspect them for defects. Blanks that have been found satisfactory are deposited upon the belt 36 where they are wrapped for packing and shipping.

Manifestly, the machine described is susceptible of various modifications without departing from the spirit and scope of the invention and consequently I desire that no limitation shall be imposed except such as indicated in the appended claims.

What I claim is:

1. A glass snapping machine comprising positive mechanical means for feeding a scored glass strip intermittently into position upon an anvil, a striking member mounted upon a strip of spring steel adjacent the free end thereof, said striking member being positioned over the snapping edge of said anvil and means for periodically operating the striking member to snap the glass.

2. A glass snapping machine comprising positive mechanical means for feeding a scored glass strip intermittently into position upon an anvil, means for engaging the glass at intervals to retain it in position, a striking member mounted upon a strip of spring steel adjacent the free end thereof, said striking member being positioned over the snapping edge of said anvil and means for periodically operating the striking member to snap the glass strip at the score.

EDWARD OSTERMIER.